(12) United States Patent
Kondo et al.

(10) Patent No.: US 7,248,599 B2
(45) Date of Patent: Jul. 24, 2007

(54) SIGNAL PROCESSING APPARATUS

(75) Inventors: Tetsujiro Kondo, Tokyo (JP); Hideo Nakaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 09/866,286

(22) Filed: May 25, 2001

(65) Prior Publication Data

US 2002/0009097 A1 Jan. 24, 2002

(30) Foreign Application Priority Data

May 26, 2000 (JP) .............................. 2000-155823

(51) Int. Cl.
*H04B 7/212* (2006.01)
*H04J 3/16* (2006.01)
*H04J 3/22* (2006.01)

(52) U.S. Cl. ....................................... 370/442; 370/465

(58) Field of Classification Search ................ 370/336, 370/337, 345–350, 442–444, 503–520
See application file for complete search history.

(56) References Cited

U.S. PATENT DOCUMENTS 5,140,584 A * 8/1992 Suzuki ....................... 370/235
5,469,434 A * 11/1995 Kurdzo et al. ............... 370/364
5,499,057 A    3/1996 Kondo et al. ................ 340/647
5,969,770 A * 10/1999 Horton ........................ 348/569
6,453,360 B1 * 9/2002 Muller et al. ................ 709/250
6,519,655 B1 * 2/2003 Pitot et al. ..................... 710/5
6,771,663 B1 * 8/2004 Jha ............................. 370/473

FOREIGN PATENT DOCUMENTS

JP        07-115569        5/1995
JP        09-147101        6/1997

* cited by examiner

Primary Examiner—Daniel J. Ryman
(74) Attorney, Agent, or Firm—Frommer Lawrence & Haug LLP; William S. Frommer; Thomas F. Presson (57) ABSTRACT

A signal processing apparatus receives a time divisional multiplexed signal including a plurality of kinds of data. The signal processing apparatus includes a processing unit for processing plural kinds of operations corresponding to the data of the time divisional multiplexed signal, and a changing unit for changing the operation of the processing unit to one of the operations, corresponding to the data at the timing of the transit of the data.

8 Claims, 6 Drawing Sheets

FIG. 1

FIG. 2A TIME DIVISIONAL MULTIPLEXED DATA

FIG. 2B SYNCHRONIZING SIGNAL

SIGNAL PROCESSING APPARATUS

BACKGROUND OF THE INVENTION

1. Field of the Invention

The present invention relates to signal processing apparatuses, and more particularly relates to a signal processing apparatus capable of executing a process on time divisional multiplexed data in accordance with the type of the data.

2. Description of the Related Art

Apparatuses that can execute a plurality of processes without altering the basic hardware configuration thereof have been developed.

However, an apparatus which receives time divisional multiplexed data and which switches a process to be executed in accordance with the type of the received data has not been disclosed.

SUMMARY OF THE INVENTION

Accordingly, it is an object of the present invention to provide a signal processing apparatus that can switch a process to be executed in accordance with the type of time divisional multiplexed data applied to the process.

To this end, there is provided a signal processing apparatus for receiving a time divisional multiplexed signal including a plurality of kinds of data. The signal processing apparatus includes a processing unit for processing plural kinds of operations corresponding to the data of the time divisional multiplexed signal, and a changing unit for changing the operation of the processing unit to one of the operations, corresponding to the data at the timing of the transit of the data.

The processing unit may provide an output generated by the processing unit to an input terminal of a device corresponding to each kind of the data of the time divisional multiplexed signal.

The processing means may includes a first data-extracting unit for extracting a plurality of data as class data from the data, a characteristic signal output unit for outputting a signal indicating characteristics of the class data based on the class data, and a generating unit for generating output data based on the signal indicating the characteristics.

The processing unit may include a first data-extracting unit for extracting a plurality of data as class data from the data, a characteristic signal output unit for outputting a signal indicating characteristics of the class data based on the class data, a second data-extracting unit for extracting a plurality of data as generation data from the data, a storage unit for storing coefficient information corresponding to the signal indicating the characteristics, and a generating unit for generating output data by performing computation using the generation data and the coefficient information.

The first data-extracting unit may extract the class data based on class data forming information set in accordance with an instruction from the changing unit.

The second data-extracting unit may extract the generation data based on generation data forming information set in accordance with an instruction from the changing unit.

The storage unit may store the coefficient information according to the type of the data, and outputs coefficient information, corresponding to the signal indicating the characteristics, from among the coefficient information corresponding to an instruction from the changing unit.

The changing unit may include a finding unit for finding the type of the data based on the time divisional multiplexed signal including a plurality of kinds of data.

According to the signal processing apparatus to which the present invention is applied, a plurality of different processes can be executed in accordance with the type of the data which is time-divisionally-multiplexed in the input signal. When the type of the time divisional multiplexed data in the input signal is changed, the process executed by the executing unit is switched in accordance with the type of the changed data.

DESCRIPTION OF THE PREFERRED EMBODIMENTS

Figure 1:
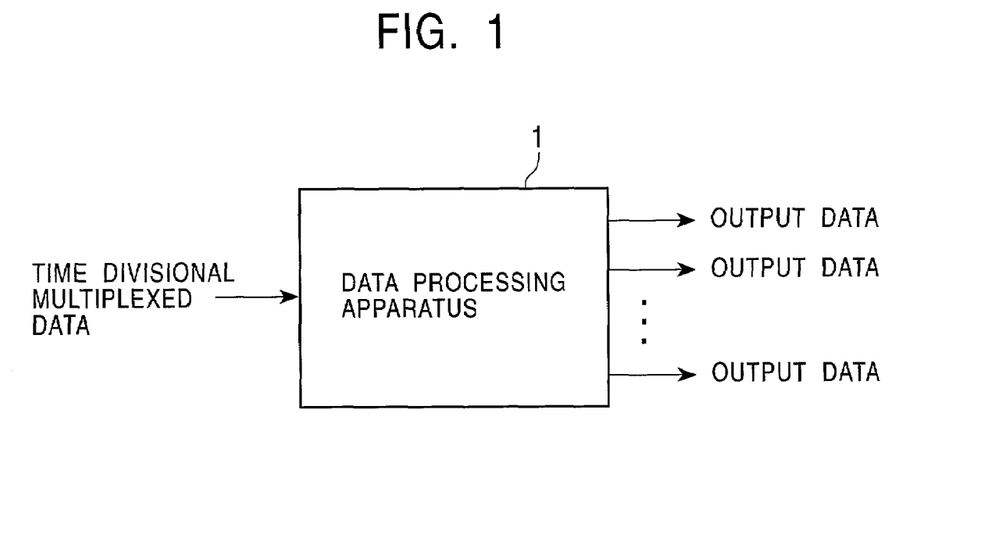
FIG. 1 is a diagram illustrating an example of a data processing apparatus to which the present invention is applied.

FIG. 1 shows an example in which the present invention is applied to a data processing apparatus 1. N types of data $D_1$ to $D_N$ (hereinafter, referred to simply as data D where there is no need to distinguish from each other; and other numerals are referred to in the same manner) which are each time divisional multiplexed input data are input into the data processing apparatus 1.

Figures 2A, 2B:
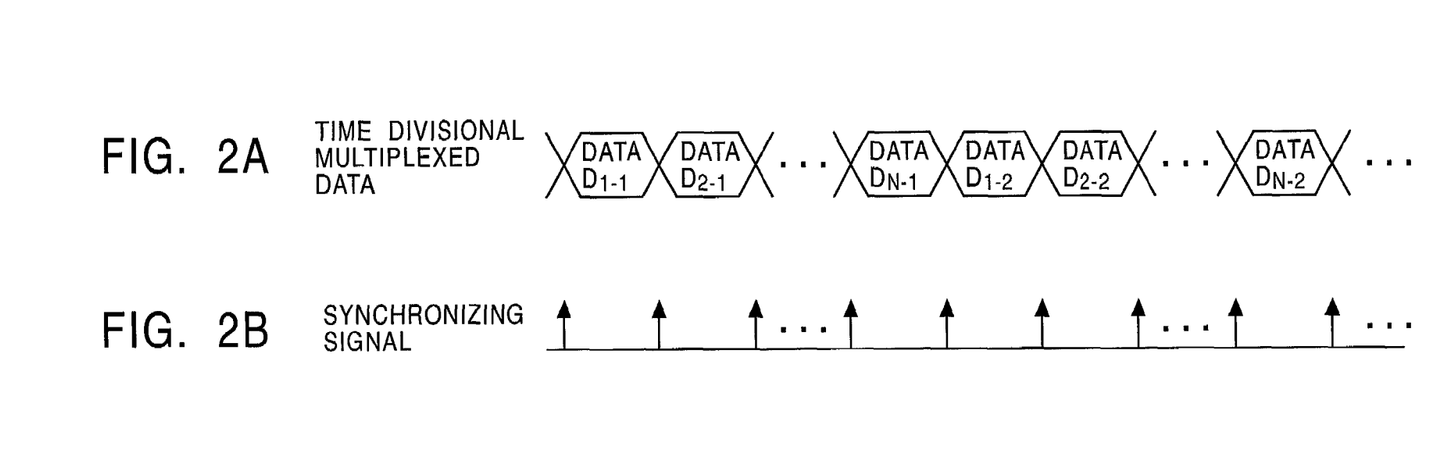
FIGS. 2A and 2B are diagrams illustrating time divisional multiplexed input data and synchronizing signals corresponding to the time divisional multiplexed input data, respectively.

FIG. 2A shows time divisional multiplexed input data. For simplicity, only data $D_{1-1}$ and $D_{1-2}$ constituting data $D_1$, data $D_{2-1}$ and $D_{2-2}$ constituting data $D_2$, and data $D_{N-1}$ and $D_{N-2}$ constituting $D_N$ are shown from among data $D_1$ to $D_N$. Other data constituting data $D_1$ along with the data $D_{1-1}$ and $D_{1-2}$, other data constituting data $D_2$ along with the data $D_{2-1}$ and $D_{2-2}$, and other data constituting data $D_N$ along with data $D_{N-1}$ and $D_{N-2}$ are not shown. In addition, other data $D_3$ to $D_{N-1}$, which are time-divisionally-multiplexed along with the data $D_1$, $D_2$, and $D_N$, are not shown either.

The data processing apparatus 1 can execute a process in accordance with the type of each of the time divisional multiplexed input data D. That is, the data processing apparatus 1 can execute N types of processes each corresponding to the time divisional multiplexed data $D_1$ to $D_N$.

The data processing apparatus 1 executes various processes by switching the process to be executed in accordance with the type of the input data D. For example, when the data $D_{1-1}$ and $D_{1-2}$ are input, the process to be executed by the data processing apparatus 1 is switched to the process corresponding to the data $D_1$; and when data $D_{2-1}$ and $D_{2-2}$ are input, the process to be executed is switched to the process corresponding to the data $D_2$. Consequently, the data $D_1$ undergoes the process in accordance with the type thereof and the resultant data is output to a predetermined destination. Likewise, the data $D_2$ undergoes the process in accordance with the type thereof and the resultant data is output to a predetermined destination.

Figure 3:
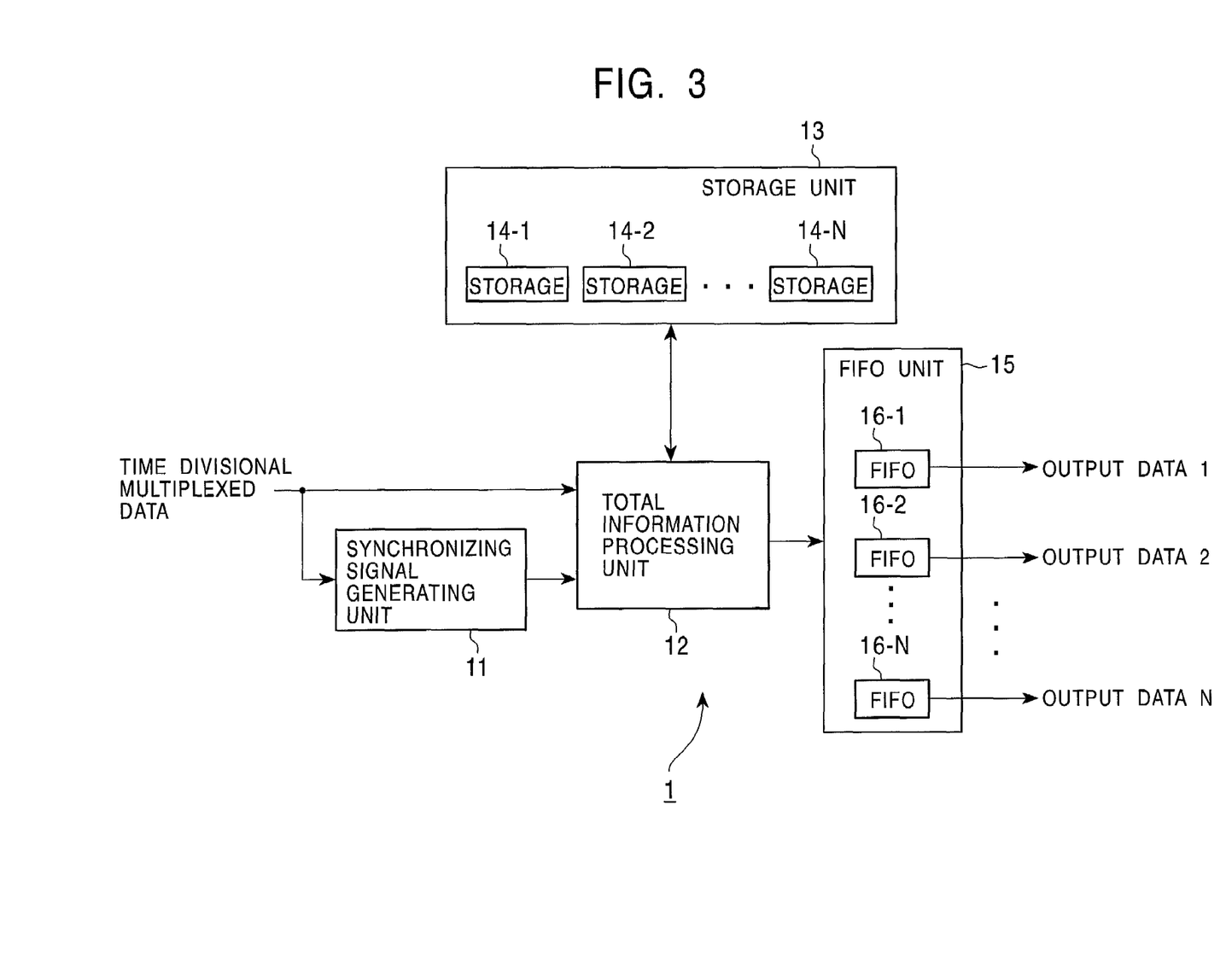
FIG. 3 is a block diagram illustrating an example configuration of the data processing apparatus in FIG. 1.

FIG. 3 shows an example configuration of the data processing apparatus 1.

When being input to the data processing apparatus 1, the time-divided data D is supplied to a synchronizing signal generating unit 11 and a total-information processing unit 12.

The synchronizing signal generating unit 11 reads synchronizing information by referring to the header attached to the time divisional multiplexed data D, generates a synchronizing signal based on the read synchronized information, and supplies the generated synchronizing signal to the total-information processing unit 12. For example, as shown in FIG. 2B, clock signals are generated as the synchronizing signals so as to correspond to the position at which each of the time divisional multiplexed data D occurs.

The total-information processing unit 12 executes the process (hereinafter, referred to as a specific process) on the input time divisional multiplexed data D in accordance with the type of each of the input data D.

In addition, the total-information processing unit 12 selects a corresponding storage device from among a plurality of storage devices 14-1 to 14-N in the storage unit 13 in accordance with the type of each of the input data D (hereinafter, referred to as a storage selecting process).

When the total-information processing unit 12 executes the specific process, various data (hereinafter, referred to as necessary data) required for executing each specific process is appropriately supplied to the selected storage device 14 of the storage unit 13 to store the data in the selected storage device 14. When needed, the total-information processing unit 12 reads the necessary data from the corresponding storage device 14 of the storage unit 13 and executes the specific process using the read data.

The total-information processing unit 12 supplies the resultant data (hereinafter, referred to as generated data) generated by the specific process to the selected storage device 14 in the storage unit 13 to store it in the storage device 14.

In addition, the total-information processing unit 12 selects a FIFO unit among FIFO 16-1 to FIFO 16-N in the FIFO unit 15 in accordance with the type of each of the input data D (hereinafter, referred to as a FIFO selecting process). The total-information processing unit 12 reads processing unit data from the output unit of the corresponding storage device 14 in the storage unit 13 at a predetermined timing and supplies the read processing unit data to the selected FIFO 16 in the FIFO unit 15. Hereinafter, the output unit data read from the storage unit 13 is referred to as the output unit data.

A case is described in which the noise rejection process is executed on the data $D_1$ and the luminance adjusting process is executed on the data $D_2$ where data $D_1$ and $D_2$ are image data.

In this case, as shown in FIG. 2A, the data $D_1$ (data $D_{1-1}$, $D_{1-2}$, ...) are image data and the specific process which is executed on the data $D_1$ is the noise rejection process. By executing the storage selecting process on the data $D_1$, the storage device 14-1 in the storage unit 13 is selected. By executing the FIFO selecting process, the FIFO 16-1 of the FIFO unit 15 is selected.

When, for example, the data $D_{1-1}$, which constitutes the data $D_1$ is input into the data processing apparatus 1, the total-information processing unit 12 executes the noise rejection process on the data $D_{1-1}$, the generated processing unit data (hereinafter, referred to as the processing unit data $D_1$) is supplied to the storage device 14-1 of the storage unit 13 to store it in the storage device 14-1. The processing unit data $D_1$ is read as the output unit data (hereinafter, referred to as the output unit data D1) from the storage device 14-1 at a predetermined timing and the output unit data $D_1$ is supplied to the FIFO 16-1 in the FIFO unit 15.

In this case, the data $D_2$ (data $D_{2-1}$, $D_{2-2}$, ...) are also image data. The specific process which is executed on the data $D_2$ adjusts the luminance of the image. Executing the storage selecting process corresponding to the data $D_2$ selects the storage device 14-2 of the storage unit 13 and executing the FIFO selecting process selects the FIFO 16-2 in the FIFO unit 15.

When, for example, the data $D_{2-1}$ which constitutes the data $D_2$ is input into the data processing apparatus 1, the total-information processing unit 12 executes the noise rejection process on the data $D_{2-1}$, and the resultant processing unit data (hereinafter, referred to as the processing unit data $D_2$) is supplied to the storage device 14-2 of the storage unit 13 so that it can be stored in the storage device 14-2. The processing unit data $D_2$ is read at a predetermined timing as the output unit data (hereinafter, referred to as the output unit data $D_2$) from the storage device 14-2 and the output unit data $D_2$ is supplied to the FIFO 16-2 of the FIFO unit 15.

The storage unit 13 includes N storage devices 14-1 to 14-N. The storage device 14 selected by the total-information processing unit 12 stores the necessary data and the processing unit data supplied from the total-information processing unit 12 and supplies these data to the total-information processing unit 12 upon request.

The FIFO unit 15 includes the FIFOs 16-1 to 16-N, which are connected to external devices. The corresponding FIFO 16 selected by the total-information processing unit 12 temporarily stores the output unit data supplied from the total-information processing unit 12 and outputs it to the corresponding external device connected thereto.

In this case, for example, the FIFO 16-1 of the FIFO unit 15 is connected to a VTR (Video Tape Recorder; not shown) via, for example, an IEEE1394 bus. That is, since the output unit data $D_1$ (generated by executing the noise rejection process on the data $D_1$) is supplied to the VTR, the VTR can read or write image data, from which noise is removed, from the data $D_1$.

The FIFO 16-2 of the FIFO unit 15 is connected to a display apparatus (not shown). That is, since the output unit data $D_2$ (generated by performing the luminance adjusting process on the data $D_2$) is supplied to the display apparatus, the display apparatus can display the image of the luminance-adjusted data $D_2$.

Figure 4:
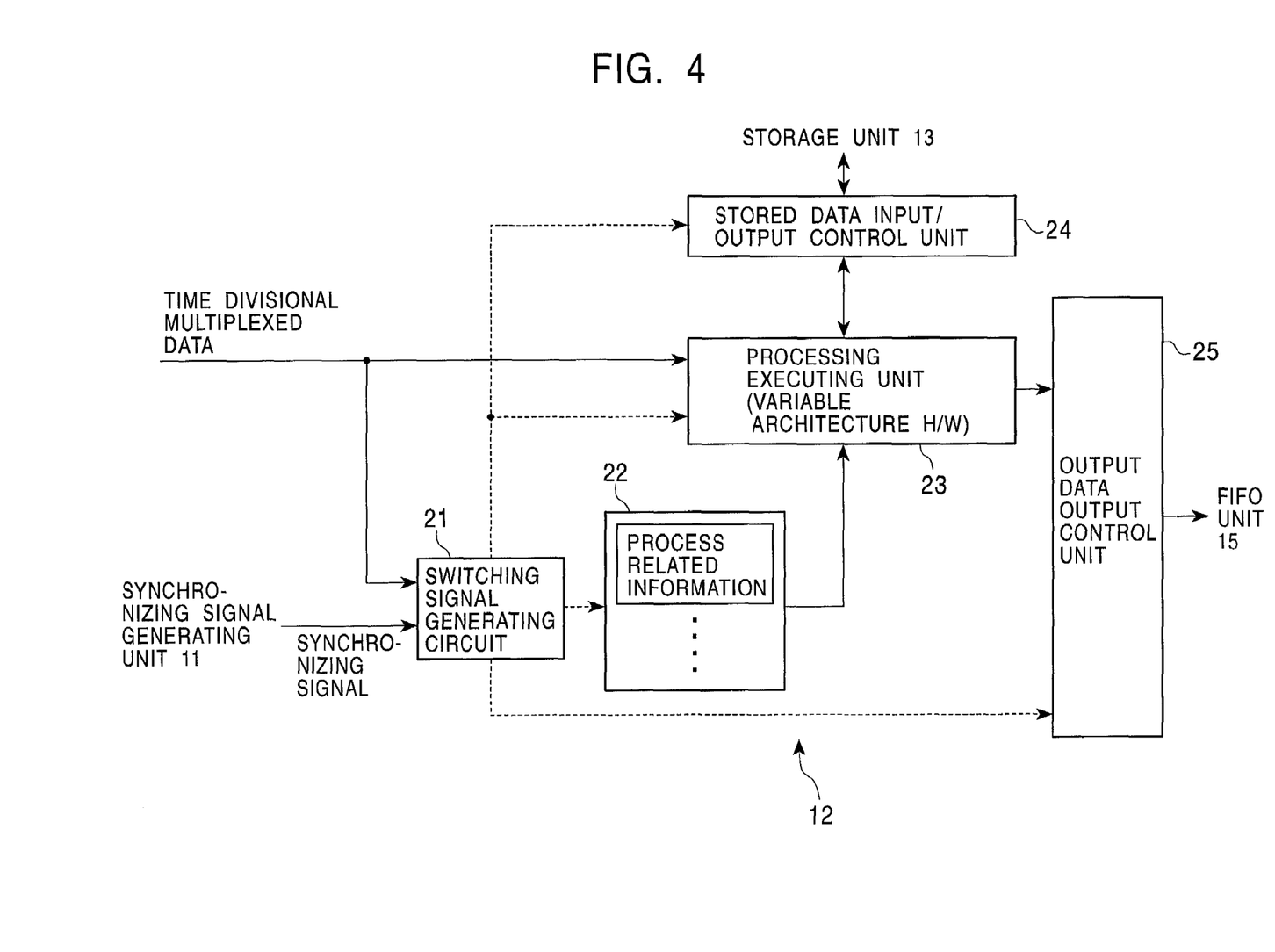
FIG. 4 is a block diagram illustrating an example configuration of a total-information processing unit in FIG. 3.

FIG. 4 shows an example configuration of the total-information processing unit 12.

The total-information processing unit 12 includes a switching signal generating circuit 21, a process-related-information managing unit 22, a processing executing unit 23, a storage-data input/output control unit 24, and an output-data output control unit 25.

When being supplied to the total-information processing unit 12, the time divisional multiplexed data D is supplied to both the switching signal generating circuit 21 and the processing executing unit 23. When being supplied from the synchronizing signal generating unit 11 to the total-information processing unit 12, a synchronizing signal is supplied to the switching signal generating circuit 21.

The switching signal generating circuit 21 examines the header attached to the supplied time divisional multiplexed data D and finds the type of the data D.

After finding the type of data D, the switching signal generating circuit 21 generates a signal (hereinafter, referred to as a switching signal) containing information on the type of the data D (hereinafter, referred to as type information).

The switching signal generating circuit 21 outputs the generated switching signal to the process-related-information managing unit 22 or the output-data output control unit 25 at a timing corresponding to the synchronizing signal supplied from the synchronizing signal generating unit 11. For example, the switching signal is output at a timing corresponding to the synchronizing signal shown in FIG. 2B.

The process-related-information managing unit 22 stores information on the specific process (hereinafter, referred to as process related information) executed by the processing executing unit 23. When the process-related-information managing unit 22 receives the switching signal from the switching signal generating circuit 21, process related information on the specific process corresponding to the data D, which is indicated by type information contained in the switching signal, is supplied to the processing executing unit 23.

The processing executing unit 23 executes the specific process, corresponding to the type indicated by the switching signal from the switching signal generating circuit 21, on the supplied time divisional multiplexed data D, based on the process related information supplied from the process-related-information managing unit 22.

The storage-data input/output control unit 24 selects the corresponding storage device 14 in the storage unit 13 in accordance with the type of the data D indicated by the switching signal from the switching signal generating circuit 21 (in other words, executes the storage selection process).

Thus, the processing executing unit 23 causes the necessary data required for executing the specific process to be supplied to the selected storage device 14 in the storage unit 13 via the storage-data input/output control unit 24 to store it in the storage device 14. When needed, the processing executing unit 23 reads the necessary data via the storage-data input/output control unit 24 and executes the specific process making use of the necessary data.

The processing executing unit 23 supplies processing unit data generated by executing the specific process to the selected storage device 14 in the storage unit 13 via the storage-data input/output control unit 24 to store it in the storage device 14.

The output-data output control unit 25 selects the corresponding FIFO 16 in the FIFO unit 15 in accordance with the type of the data D indicated by the switching signal from the switching signal generating circuit 21 (in other words, executes the FIFO selection process).

Thus, the processing executing unit 23 reads the output unit data from the corresponding storage device 14 in the storage unit 13 via the storage-data input/output control unit 24 at a predetermined timing and outputs the read data to the selected FIFO 16 of the FIFO unit 15 via the output-data output control unit 25.

The operation of the total-information processing unit 12 is described.

The data $D_{1-1}$ from among the time divisional multiplexed input data shown in FIG. 2A is supplied to the total-information processing unit 12 (the switching signal generating circuit 21 and the processing executing unit 23). At this time, the switching signal generating circuit 21 examines, for example, the header attached in the data $D_{1-1}$ and finds that the data $D_{1-1}$ constitutes the data $D_1$, which identifies that the data $D_1$ is the data $D_1$.

The switching signal generating circuit 21 generates a switching signal including type information indicating the data $D_1$ and outputs the switching signal to the process-related-information managing unit 22 or the output-data output control unit 25 at a timing corresponding to a synchronizing signal (FIG. 2B) from the synchronizing generating unit 11.

The process-related-information managing unit 22 supplies, to the processing executing unit 23, the process related information on the noise rejection process corresponding to the data $D_1$ indicated by the switching signal from the switching signal generating circuit 21.

The processing executing unit 23 executes the noise rejection process corresponding to the data $D_1$ indicated by the switching signal from the switching signal generating circuit 21 on the supplied data $D_{1-1}$, based on the process related information supplied from the process-related-information managing unit 22.

The storage-data input/output control unit 24 selects the storage device 14-1 in the storage unit 13 corresponding to the data $D_1$ indicated by the switching signal from the switching signal generating circuit 21 (in other words, executes the storage selection process so as to select the storage device 14-1).

The processing executing unit 23 supplies necessary data required for executing the noise rejection process via the storage-data input/output control unit 24 to the selected storage device 14-1 in the storage unit 13 to store it in the storage device 14-1. When needed, the processing executing unit 23 reads the necessary data via the storage-data input/output control unit 24 and executes the noise rejection process making use of it.

The processing executing unit 23 supplies the processing unit data $D_1$ generated by executing the noise rejection process on the data $D_{1-1}$ to the selected storage device 14-1 in the storage unit 13 via the storage-data input/output control unit 24 to store it in the storage device 14-1.

The output-data output control unit 25 selects the FIFO 16-1 in the FIFO unit 15 corresponding to the data $D_1$ indicated by the switching signal from the switching signal generating circuit 21 (in other words, executes the FIFO selection process so as to select the FIFO 16-1).

The processing executing unit 23 reads the output unit data $D_1$ via the storage-data input/output control unit 24 from the storage device 14-1 in the storage unit 13 at a predetermined timing and supplies the read data $D_1$ via the output-data output control unit 15 to the selected FIFO 16-1 in the FIFO unit 15.

Thus, when the data $D_{1-1}$ constituting the data $D_1$ is supplied to the total-information processing unit 12, the noise rejection process is executed on the data $D_{1-1}$.

In the time divisional multiplexed input data in FIG. 2A, the data $D_{2-1}$ to be time-divisionally-multiplexed after the data $D_{1-1}$ is supplied to the total-information processing unit 12 (the switching signal generating circuit 21 and the processing executing unit 23). At this time, the switching signal generating circuit 21 examines the header attached in the time divisional multiplexed data $D_{2-1}$ and finds that the data $D_{2-1}$ supplied to the total-information processing unit 12 constitutes the data $D_2$.

The switching signal generating circuit 21 generates the switching signal containing type information indicating the data $D_2$ and outputs the generated signal to the process-related-information managing unit 22 or the output-data output control unit 25 at a timing corresponding to the synchronizing signal (FIG. 2B) from the synchronizing signal generating unit 11.

The process-related-information managing unit 22 supplies process related information on the luminance adjusting process, corresponding to the data $D_2$ indicated by the switching signal from the switching signal generating circuit 21, to the processing executing unit 23.

The processing executing unit 23 executes the luminance adjusting process, which corresponds to the data $D_2$ indicated by the switching signal from the switching signal generating circuit 21, on the supplied data $D_{2-1}$, based on the process related information supplied from the process-related-information managing unit 22.

The storage-data input/output control unit 24 selects the storage device 14-2 in the storage unit 13 corresponding to the data $D_2$ indicated by the switching signal from the switching signal generating circuit 21 (in other words, executes the storage selection process so as to select the storage device 14-2).

The processing executing unit 23 supplies necessary data required for executing the luminance adjusting process to the selected storage device 14-2 in the storage unit 13 via the storage-data input/output control unit 24 to store it in the storage device 14-2. The processing executing unit 23 reads the necessary data via the storage-data input/output control unit 24 and executes the luminance adjusting process making use of it.

The processing executing unit 23 supplies the processing unit data $D_1$ generated by executing the luminance adjusting process on the data $D_{2-1}$ via the storage-data input/output control unit 24 to the selected storage device 14-2 in the storage unit 13 to store it in the storage device 14-2.

The output-data output control unit 25 selects the FIFO 16-2 in the FIFO unit 15 corresponding to the data $D_2$ indicated by the switching signal from the switching signal generating circuit 21 (in other words, executes the FIFO selection process so as to select the FIFO 16-2).

The processing executing unit 23 reads the output unit data $D_2$ via the storage-data input/output control unit 24 from the storage device 14-2 in the storage unit 13 at a predetermined timing and supplies the output unit data $D_2$ via the output-data output control unit 15 to the selected FIFO 16-2 of the FIFO unit 15.

Thus, when the data $D_{2-1}$ constituting the data $D_2$ is supplied to the total-information processing unit 12, the luminance adjusting process is executed on the data $D_{2-1}$.

As described above, the process (the specific process, the storage selection process, or the FIFO selection process) executed by the total-information processing unit 12 is switched in accordance with the type of the time divisional multiplexed data D. As a result of this, an image obtained by removing noise from the data $D_1$ is supplied to the VTR while an image obtained by adjusting the luminance of the data $D_2$ is supplied to the display apparatus.

The case is described in which the process-related-information managing unit 22 and the output-data output control unit 25 execute the process in accordance with the type information contained in the switching signal from the switching signal generating circuit 21. Alternatively, a switching signal is generated to simply serve as a process-switch-timing signal, and the process-related-information managing unit 22 and the output-data output control unit 25 are arranged so as to switch a process to be executed in a predetermined order in accordance with the timing indicated by the switching signal.

For example, when the time divisional multiplexed input data arranged in the order of the data $D_1$ to data $D_N$, as shown in FIG. 2A, is supplied to the data processing apparatus 1, the process-related-information managing unit 22 and the output-data output control unit 25 may switch the process to be executed in accordance with the arranged order of data.

Figure 5:
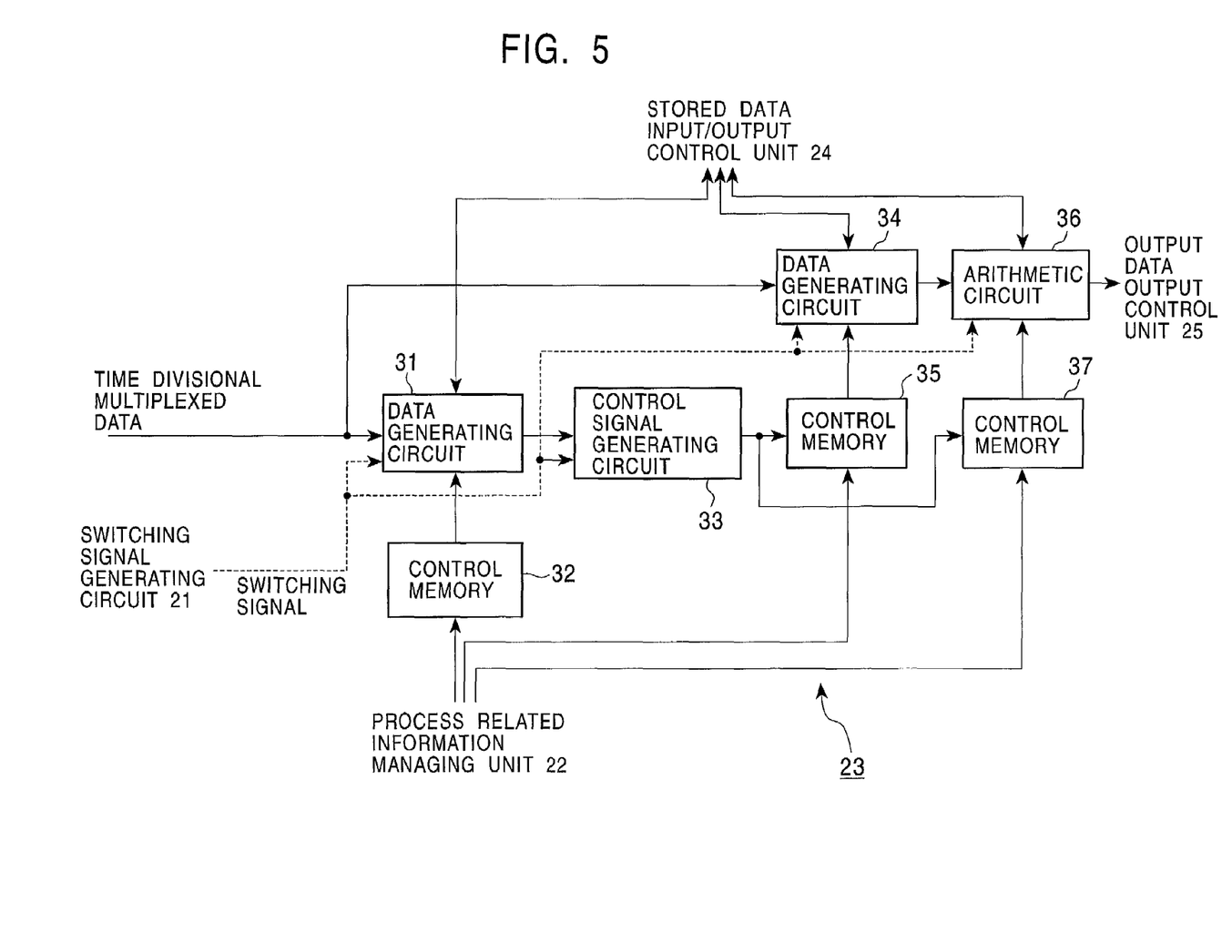
FIG. 5 is a block diagram illustrating an example configuration of a processing executing unit in FIG. 4.

The configuration of the processing executing unit 23 is described with reference to FIG. 5.

The processing executing unit 23 includes two data generating circuits 31 and 34, three control memories 32, 35, and 37, a control signal generating circuit 33, and an arithmetic circuit 36.

The control memories 32, 35, and 37 store process related information supplied from the process-related-information managing unit 22. In addition, when needed, they correspondingly supply the process-related information to the data generating circuits 31 and 34 and the arithmetic circuit 36. The process-related information supplied to the control memories 32, 35, and 37 varies in accordance with the data generated by the data generating circuits 31 and 34 or the computation executed by the arithmetic circuit 36. That is, the process-related information varies depending on the specific process executed by the processing executing unit 23 such as the noise rejection process or the luminance adjusting process. The actual example is described below.

The time divisional multiplexed data D supplied to the processing executing unit 23 is supplied to the data generating circuit 31 and the data generating circuit 34. When being supplied from the switching signal generating circuit 21 to the processing executing unit 23, the switching signal is individually supplied to the data generating circuits 31 and 34, the control signal generating circuit 33, and the arithmetic circuit 36.

The data generating circuit 31 generates data (hereinafter, referred to as processing data) required for executing the specific process corresponding to the type of the supplied data D based on the process related information supplied from the control memory 32, and supplies the generated data to the control signal generating circuit 33. An actual example of the processing data generated by the data generating circuit 31 is described below.

At this time, the data generating circuit 31 supplies necessary data required for generating the processing data via the stored-data input/output control unit 24 to a corresponding storage device 14 of the storage unit 13 to store it in the storage device 14. When needed, the data generating circuit 31 reads the necessary data via the storage-data input/output control unit 24 and generates the processing data making using of it.

The control signal generating circuit 33 generates a control signal required for the specific process corresponding to the type of the data D indicated by the switching signal from the switching signal generating circuit 21 based on the processing data supplied from the data generating circuit 31 and supplies the control signal to the control memories 35 and 37. An actual example of the control signal generated by the control signal generating circuit 33 is described below.

Process related information, which is stored in a location whose address corresponds to the control signal supplied from the control signal generating circuit 33, is supplied to the data generating circuit 34.

The data generating circuit 34 generates processing data required for executing the specific process corresponding to the type of the supplied data D based on the process-related information supplied from the control memory 35 and supplies the generated processing data to the arithmetic process 36. An actual example of the processing data generated by the data generating circuit 34 is described below.

At this time, the data generating circuit 34 generates necessary data required for generating processing data and supplies it via the storage-data input/output control unit 24 to a corresponding storage device 14 of the storage unit 13 to store it in the storage device 14. When needed, the data generating circuit 34 reads the necessary data via the storage-data input/output control unit 24 and utilize it to generate processing data.

Process related information, which is stored in a location whose address corresponds to the control signal supplied from the control signal generating circuit 33, from among the stored process related information is supplied to the arithmetic circuit 36.

The arithmetic circuit 36 executes the computation corresponding to the type of the data D indicated by the switching signal from the switching signal generating circuit 21 by using the processing data supplied from the data generating circuit 34 and the processing related information supplied from the control memory 37. The resultant computed data (processing unit data) is supplied via the storage-data input/output control unit 24 to a corresponding storage device 14 in the storage unit 13.

The arithmetic circuit 36 also reads output unit data via the storage-data input/output control unit 24 from a corresponding storage device 14 in the storage unit 13 at a predetermined timing. In addition, the arithmetic circuit 36 supplies the output unit data via the output-data output control unit 25 to a corresponding FIFO16 of the FIFO unit 15.

An operation of the processing executing unit 23 is described in a case in which a classification adaptive process is executed as the noise rejection process. That is, in this case, the data generating circuit 31 generates a class tap as the processing data. The control signal generating circuit 33 generates a class code as the control signal. The data generating circuit 34 generates a predictive tap as the processing data. The arithmetic circuit 36 computes the pixel value of a pixel of interest to predict.

That is, process related information from the process-related-information managing unit 22, which is stored in the control memory 32 at this time, is information (hereinafter, referred to as class tap forming information) on the pixels selected as the class tap in this classification adaptive process. Process related information stored in the control memory 35 is information (hereinafter, referred to as predictive tap forming information) on the pixels selected as the predictive tap in this classification adaptive process. Process related information stored in the control memory 37 are predictive coefficients for performing predictive value computation in this classification adaptive process.

Figure 6:
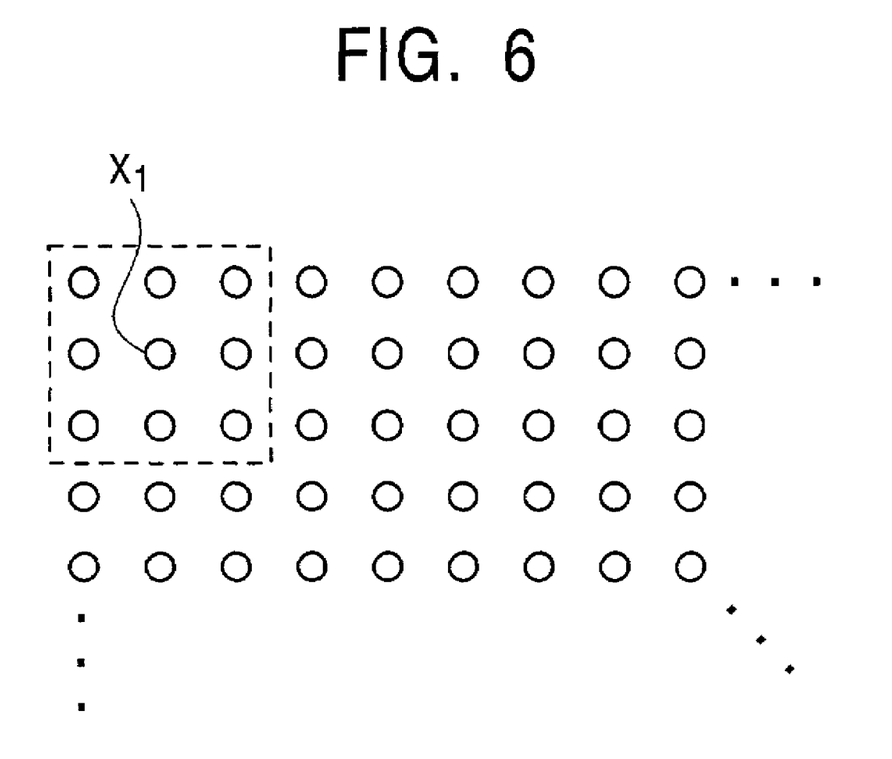
FIG. 6 is a diagram illustrating a class tap and predictive tap.

The data generating circuit 31 sequentially sets a pixel, which constitute the final image (the image having noise removed) obtained by means of the classification adaptive process, as a pixel of interest, selects the pixel indicated by the class tap forming information supplied from the control memory 32, with respect to the pixel of interest, from among the image (input image) of the data D, and supplies the selected pixel as the class tap to the control signal generating circuit 33. For example, as shown in FIG. 6, 3×3 pixels (the pixels within the dashed-line frame in the figure) around a pixel X1 of the input image corresponding to the pixel of interest are selected as the class tap.

The control signal generating circuit 33 finds characteristic (for example, the distribution) of the pixel value of an input image pixel (hereinafter, referred to as an input pixel) constituting the class tap supplied from the data generating circuit 31 and supplies the value assigned in advance corresponding to the found characteristic as the class of the pixel of interest to the control memories 35 and 37.

Since 8-bit data are normally assigned to the pixels, when 8-bit data are assigned to the input pixels in this case as well, for example, the pixel values of the pixels constituting the class tap become considerable, which arises a problem in that the storage capacity of the storage device (e.g. the memory) storing the coefficient therein must be increased.

Accordingly, in this case, the control signal generating circuit 33 executes a compressing process for reducing (compressing) the bit number of each of the pixels constituting the class tap as a pre-process for executing the classification. As the bit-number compressing process method, for example, an ARDC (Adaptive Dynamic Range Coding) process may be employed.

In this ADRC process, the maximum pixel value MAX and the minimum pixel value MIN are each found from among the values of the pixels constituting the process block (class tap) and the difference DR (=the pixel value MAX− the pixel value MIN) is computed. The difference DR is set as a local dynamic range DR for the process block. That which is obtained by subtracting the pixel value MIN from the pixel value of each of the pixels constituting the process block is divided by $DR/2^K$. As a result of this, the pixel value of each of the pixels constituting the process block (class tap) is re-quantized into K-bit data in which "K" is smaller than the originally assigned bit number (8 bits). Accordingly, the use of the ADRC process can decrease the number of classes.

The compression process executed by the control signal generating circuit 33 is not restricted to the ADRC process. For example, other compressing processes such as vector quantization may be employed.

As described above, the control signal generating circuit 33 determines the class code of the pixel of interest based on the pixel values of input pixels constituting the class tap.

The data generating circuit 34 selects the input pixels, with respect to the pixel of interest, indicated by the predictive tap forming information (which is stored at the address corresponding to the class code supplied from the control signal generating circuit 33 from among the predictive tap forming information stored in the control memory 35) supplied from the control memory 35 from among the input image. These selected input pixels are supplied to the arithmetic circuit 36 as the predictive tap. In this case, the predictive tap consists of 3×3 pixels around the pixel corresponding to the pixel of interest in the same manner as the class tap.

The arithmetic circuit 36 computes the predictive value E[y] of a pixel of interest "y" in accordance with expression (1), which is a linear combination model specified by, for example, linear combination of a predictive coefficient set "w" and each pixel value "x", using the pixel values (pixel values $x_1, x_2, \ldots$) of the input pixels constituting the predictive tap supplied from the data generating circuit 34 and a predictive coefficient set (stored in the address corresponding to the class code supplied from the control signal generating circuit 33 from among the predictive coefficient set stored in the control memory 37) (predictive coefficient set $w_1, w_2, \ldots$) supplied from the control memory 37. In this case, the predictive value E[y] is processing unit data and represents the pixel value of the final image.

$$E[y]=w_1x_1+w_2x_2+\ldots \quad (1)$$

Alternatively, the computation may be performed based on a model using nonlinear combination.

The arithmetic circuit 36 supplies the processing unit data computed in this manner to the storage-data input/output control unit 24. This allows the processing unit data to be supplied to the corresponding storage device 14 in the storage unit 13 where the processing unit data is stored. In addition, the arithmetic circuit 36 reads the processing unit data stored in the corresponding storage device 14 in the storage unit 13 as the output unit data via the storage-data input/output control unit 24 at a predetermined timing and supplies the read output unit data to the output-data output control unit 24.

Thus, the classification adaptive process for removing noise is executed. The classification adaptive process for removing noise is illustrated in detail in Japanese Unexamined Patent Publication No. 7-115569 applied by the present applicant.

An operation of the processing executing unit 23 is described in a case in which the classification adaptive process corresponding to the luminance adjusting process is executed. That is, in this case, class tap forming information stored as process related information in the control memory 32, the predictive tap forming information stored as process related information in the control memory 35, and the predictive coefficient stored as process related information in the control memory 37 each correspond to the classification coefficient process for adjusting the luminance.

The data generating circuit 31 supplies the luminance values of the pixels in, for example, one field or one frame of the input image to the control signal generating circuit 33.

Furthermore, the data generating circuit 31 forms the class tap based on the class tap forming information supplied from the control memory 32 and supplies the generated class tap to the control signal generating circuit 33.

The control signal generating circuit 33 generates "n" bit code based on the luminance values of the pixels in one field or one frame supplied from the data generating circuit 31. To be specific, the luminance values are divided into "s" regions and the frequencies of the pixels in each supplied field or frame are added up for each divided region. Based on the added-up frequencies, quantization into "a" bit data is performed on every divided region, so that "n" (="s"×"a") bit code is generated. This generated code (hereinafter, referred to as a first class code) indicates the deviation of the luminance value distribution (which shows the deviation of the luminance value distribution to the dark side or the bright side).

The control signal generating circuit 33 finds the maximum and minimum luminance values from among the input pixels constituting the class tap supplied from the data generating circuit 31. An "m" bit code is generated based on the found maximum and minimum values. This generated code (hereinafter, referred to as a second class code) represents the variation in the luminance of the space.

The control signal generating circuit 33 computes the average of the luminance values of the input pixels constituting the class tap supplied from the data generating circuit 31 and the computed average is quantized, so that a third class code is generated.

The control signal generating circuit 33 determines the final class code based on the generated first class code, second class code, and third class code and supplies the determined final class code to both control memories 35 and 37.

Since steps executed by the data executing circuit 34 to the control memory 37 in this case are basically identical to those during execution of the above-described classification adaptive process for removing noise, the description thereof is omitted.

Thus, the classification adaptive process for adjusting the luminance is executed. The classification adaptive process for adjusting the luminance was already disclosed by the present applicant in Japanese Unexamined Patent Publication No. 9-147101. The classification adaptive process is also disclosed in U.S. Pat. No. 5,499,057.

What is claimed is:

1. A signal processing apparatus for receiving a time divisional multiplexed signal including a plurality of kinds of data, said signal processing apparatus comprising:

switching signal generating means for identifying a type of each of a plurality of kinds of data received as part of said time divisional multiplexed signal, wherein said identification is based on information in a header of said time divisional multiplexed signal, said switch signal generating means generating a signal containing the type of data;

memory means for storing each of said plurality of kinds of data to one of a plurality of memory areas according to the identified type;

processing means for executing one of a plurality of functional operations corresponding to the type of data of said time divisional multiplexed signal read from said plural memory areas at certain timing;

memory input/output control means for selecting the area for storage in said memory means of a type of data in accordance with its identified type, retrieving from said memory means the stored data to be read by said processing means and supplying to said memory means data generated by said processing means after execution of one or more of the plurality of functional operations; and changing means for changing the operation of said processing means to one of said plurality of functional operations, corresponding to the type of data at the timing of the transit of said data to the processing means.

2. A signal processing apparatus according to claim 1, wherein said processing means provides an output generated by said processing means to an input terminal of a device corresponding to each kind of the data of said time divisional multiplexed signal.

3. A signal processing apparatus according to claim 1, wherein:

said processing means comprises:

first data-extracting means for extracting a plurality of data as class data from said data;

characteristic signal output means for outputting a signal indicating characteristics of said class data based on said class data; and generating means for generating output data based on the signal indicating the characteristics.

4. A signal processing apparatus according to claim 3, wherein said first data-extracting means extracts said class data based on class data forming information set in accordance with an instruction from said changing means.

5. A signal processing apparatus according to claim 1, wherein:

said processing means comprises:

first data-extracting means for extracting a plurality of data as class data from said data;

characteristic signal output means for outputting a signal indicating characteristics of said class data based on said class data;

second data-extracting means for extracting a plurality of data as generation data from said data;

storage means for storing coefficient information corresponding to the signal indicating the characteristics; and generating means for generating output data by performing computation using said generation data and said coefficient information.

6. A signal processing apparatus according to claim 5, wherein said second data-extracting means extracts said generation data based on generation data forming information set in accordance with an instruction from said changing means.

7. A signal processing apparatus according to claim 5, wherein said storage means stores said coefficient information according to the type of said data, and outputs coefficient information, corresponding to the signal indicating the characteristics, from among said coefficient information corresponding to an instruction from said changing means.

8. A signal processing apparatus according to claim 1, wherein said plurality of functional operations are noise and luminance adjusting.

* * * * *